United States Patent
Jun et al.

(10) Patent No.: US 12,273,510 B2
(45) Date of Patent: *Apr. 8, 2025

(54) METHOD AND APPARATUS FOR ENCODING/DECODING IMAGE AND RECORDING MEDIUM STORING BIT STREAM

(71) Applicant: Electronics and Telecommunications Research Institute, Daejeon (KR)

(72) Inventors: Dong San Jun, Daejeon (KR); Jin Ho Lee, Daejeon (KR); Jung Won Kang, Daejeon (KR); Hyun Suk Ko, Daejeon (KR); Sung Chang Lim, Daejeon (KR); Ha Hyun Lee, Seoul (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,393

(22) Filed: Sep. 1, 2023

(65) Prior Publication Data

US 2023/0421757 A1 Dec. 28, 2023

Related U.S. Application Data

(63) Continuation of application No. 17/174,788, filed on Feb. 12, 2021, now abandoned, which is a
(Continued)

(30) Foreign Application Priority Data

Oct. 4, 2016 (KR) .................. 10-2016-0127875

(51) Int. Cl.
  *H04N 19/11* (2014.01)
  *H04N 19/176* (2014.01)
  *H04N 19/593* (2014.01)

(52) U.S. Cl.
  CPC ........... *H04N 19/11* (2014.11); *H04N 19/176* (2014.11); *H04N 19/593* (2014.11)

(58) Field of Classification Search
  CPC .................................................. H04N 19/11
  See application file for complete search history.

(56) References Cited

U.S. PATENT DOCUMENTS 8,000,390 B2 * 8/2011 Zhao ............. H04N 19/11
                                                                375/240.12
9,350,993 B2 * 5/2016 Lee .............. H04N 19/13
(Continued)

FOREIGN PATENT DOCUMENTS

CN  102934446 A  2/2013
CN  103119945 A  5/2013
(Continued)

OTHER PUBLICATIONS

International Search Report issued on Jan. 24, 2018 in corresponding International Patent Application No. PCT/KR2017/010621 (8 pages in English).
(Continued)

*Primary Examiner* — Irfan Habib
(74) *Attorney, Agent, or Firm* — NSIP Law

(57) ABSTRACT

An image encoding/decoding method and apparatus are provided. An image decoding method of the present invention comprises decoding first information indicating whether a maximum of N intra prediction modes are used or a maximum of M intra prediction modes are used for an intra prediction for a current block, in which the M is smaller than the N, deriving an intra prediction mode of the current block,
(Continued)

(a)

(b)

inverse-mapping the derived intra prediction mode on a corresponding intra prediction mode among the maximum N intra prediction modes when the decoded first information indicates that the maximum M intra prediction modes are used for the intra prediction for the current block, and generating an intra prediction block by performing an intra prediction for the current block, based on the inverse-mapped intra prediction mode.

11 Claims, 7 Drawing Sheets

Related U.S. Application Data continuation of application No. 16/336,243, filed on Mar. 25, 2019, now Pat. No. 10,958,903, which is a continuation of application No. PCT/KR2017/010621, filed on Sep. 26, 2017.

(56) References Cited

U.S. PATENT DOCUMENTS

| | | | |
|---|---|---|---|
| 9,432,675 B2* | 8/2016 | Lee | H04N 19/184 |
| 9,955,169 B2* | 4/2018 | Lee | H04N 19/176 |
| 10,771,781 B2* | 9/2020 | Lee | H04N 19/176 |
| 10,791,327 B2* | 9/2020 | Pettersson | H04N 19/105 |
| 2005/0089235 A1* | 4/2005 | Sakaguchi | H04N 19/70 |
| | | | 375/E7.199 |
| 2012/0082223 A1* | 4/2012 | Karczewicz | H04N 19/196 |
| | | | 375/E7.243 |
| 2012/0177113 A1* | 7/2012 | Guo | H04N 19/196 |
| | | | 375/E7.243 |
| 2012/0314766 A1* | 12/2012 | Chien | H04N 19/11 |
| | | | 375/E7.243 |
| 2012/0328009 A1* | 12/2012 | Sasai | H04N 19/463 |
| | | | 375/E7.243 |
| 2013/0259128 A1* | 10/2013 | Song | H04N 19/50 |
| | | | 375/240.12 |
| 2013/0266064 A1* | 10/2013 | Zhang | H04N 19/61 |
| | | | 375/240.12 |
| 2013/0272401 A1* | 10/2013 | Seregin | H04N 19/593 |
| | | | 375/240.12 |
| 2014/0064359 A1* | 3/2014 | Rapaka | H04N 19/70 |
| | | | 375/240.02 |
| 2014/0105283 A1* | 4/2014 | Li | H04N 19/126 |
| | | | 375/240.03 |
| 2014/0126629 A1 | 5/2014 | Park et al. | |
| 2014/0133558 A1* | 5/2014 | Seregin | H04N 19/109 |
| | | | 375/240.12 |
| 2014/0219342 A1* | 8/2014 | Yu | H04N 19/19 |
| | | | 375/240.12 |
| 2014/0226912 A1* | 8/2014 | Lee | H04N 19/91 |
| | | | 382/238 |
| 2014/0233644 A1 | 8/2014 | Lee | |
| 2014/0269914 A1* | 9/2014 | Oh | H04N 19/159 |
| | | | 375/240.12 |
| 2014/0286394 A1* | 9/2014 | Song | H04N 19/134 |
| | | | 375/240.02 |
| 2015/0043634 A1* | 2/2015 | Lin | H04N 19/11 |
| | | | 375/240.12 |
| 2016/0044310 A1 | 2/2016 | Park et al. | |
| 2016/0198189 A1* | 7/2016 | Lee | H04N 19/136 |
| | | | 375/240.12 |
| 2016/0255363 A1* | 9/2016 | Kim | H04N 19/513 |
| | | | 375/240.16 |
| 2016/0345012 A1* | 11/2016 | Lee | H04N 19/61 |
| 2016/0353103 A1* | 12/2016 | Park | H04N 19/44 |
| 2019/0174128 A1 | 6/2019 | Jang et al. | |
| 2019/0238841 A1* | 8/2019 | Lee | H04N 19/105 |
| 2019/0289301 A1* | 9/2019 | Lim | H04N 19/107 |
| 2020/0021800 A1* | 1/2020 | Kim | H04N 19/46 |
| 2020/0092544 A1* | 3/2020 | Zhao | H04N 19/11 |
| 2020/0195920 A1* | 6/2020 | Racape | H04N 19/70 |
| 2020/0204798 A1* | 6/2020 | Li | H04N 19/132 |
| 2020/0267382 A1* | 8/2020 | Li | H04N 19/91 |
| 2021/0344933 A1 | 11/2021 | Jeon et al. | |

FOREIGN PATENT DOCUMENTS

| | | |
|---|---|---|
| CN | 103891283 A | 6/2014 |
| CN | 103959789 A | 7/2014 |
| CN | 104170379 A | 11/2014 |
| KR | 10-2012-0058379 A | 6/2012 |
| KR | 10-2013-0137680 A | 12/2013 |
| KR | 10-2014-0049098 A | 4/2014 |
| KR | 10-2015-0045980 A | 4/2015 |
| KR | 10-2015-0046353 A | 4/2015 |
| KR | 10-2015-0071003 A | 6/2015 |
| KR | 10-1600720 B1 | 3/2016 |
| KR | 10-1630167 B1 | 6/2016 |
| WO | WO 2012/006568 A1 | 1/2012 |

OTHER PUBLICATIONS

Maani, Ehsan, et al. "Intra mode coding using logical mode numbering" JCTVC-H0407, Joint Collaborative Team on Video Coding (JCT-VC) of ITU-T SG16 WP3 and ISO/IEC JTC1/SC29/WG11 8th Meeting: San José, CA, USA, Feb. 1-10, 2012, (5 pages).

Chen, Jianle, et al. "Algorithm Description of Joint Exploration Test Model 3" JVET-C1001_v3, Joint Video Exploration Team (JVET) of ITU-T SG 16 WP 3 and ISO/IEC JTC 1/SC 29/WG 11 3rd Meeting: Geneva, CH, May 26-Jun. 1, 2016, (37 pages).

* cited by examiner

FIG. 8

| Max=67 | | Max=35 |
|---|---|---|
| 2 | | 2 |
| 3 | | 2 |
| 4 | | 3 |
| 5 | | 3 |
| 6 | | 4 |
| 7 | | 4 |
| 8 | | 5 |
| 9 | | 5 |
| 10 | | 6 |
| 11 | | 6 |
| 12 | | 7 |
| 13 | | 7 |
| 14 | | 8 |
| 15 | | 8 |
| 16 | | 9 |
| 17 | | 9 |
| 18 | | 10 |
| 19 | | 10 |
| 20 | | 11 |
| 21 | | 11 |
| 22 | | 12 |
| 23 | | 12 |
| 24 | | 13 |
| 25 | | 13 |
| 26 | | 14 |
| 27 | | 14 |
| 28 | | 15 |
| 29 | | 15 |
| 30 | | 16 |
| 31 | | 16 |
| 32 | | 17 |
| 33 | | 17 |

| 34 | | 18 |
|---|---|---|
| 35 | | 18 |
| 36 | | 19 |
| 37 | | 19 |
| 38 | | 20 |
| 39 | | 20 |
| 40 | | 21 |
| 41 | | 21 |
| 42 | | 22 |
| 43 | | 22 |
| 44 | | 23 |
| 45 | | 23 |
| 46 | | 24 |
| 47 | | 24 |
| 48 | | 25 |
| 49 | | 25 |
| 50 | | 26 |
| 51 | | 26 |
| 52 | | 27 |
| 53 | | 27 |
| 54 | | 28 |
| 55 | | 28 |
| 56 | | 29 |
| 57 | | 29 |
| 58 | | 30 |
| 59 | | 30 |
| 60 | | 31 |
| 61 | | 31 |
| 62 | | 32 |
| 63 | | 32 |
| 64 | | 33 |
| 65 | | 33 |
| 66 | | 34 |

(a)            (b)

(a)

(b)

METHOD AND APPARATUS FOR ENCODING/DECODING IMAGE AND RECORDING MEDIUM STORING BIT STREAM

CROSS REFERENCE TO RELATED APPLICATIONS

This application is a continuation of application Ser. No. 17/174,788 filed on Feb. 12, 2021, which is a continuation of application Ser. No. 16/336,243 filed on Mar. 25, 2019, which is a U.S. National Stage Application of International Application No. PCT/KR2017/010621, filed on Sep. 26, 2017, which claims the benefit under 35 USC 119(a) and 365(b) of Korean Patent Application No. 10-2016-0127875, filed on Oct. 4, 2016, in the Korean Intellectual Property Office.

TECHNICAL FIELD

The present invention relates to a method and apparatus for encoding/decoding an image and a recording medium storing a bitstream. Particularly, the present invention relates to a method and apparatus for encoding/decoding an image using intra prediction and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding an image to enhance compression efficiency.

Another object of the present invention is to provide a method and apparatus for encoding and decoding an image using intra prediction to enhance compression efficiency.

Another object of the present invention is to provide a recording medium storing a bitstream generated by an image encoding method/apparatus of the present invention.

Technical Solution

An image decoding method may comprise decoding first information indicating whether a maximum of N intra prediction modes are used or a maximum of M intra prediction modes are used for an intra prediction for a current block, in which the M is smaller than the N, deriving an intra prediction mode of the current block, inverse-mapping the derived intra prediction mode on a corresponding intra prediction mode among the maximum N intra prediction modes when the decoded first information indicates that the maximum M intra prediction modes are used for the intra prediction for the current block, and generating an intra prediction block by performing an intra prediction for the current block, based on the inverse-mapped intra prediction mode.

In the image decoding method according to the present invention, when the decoded first information indicates that the maximum M intra prediction modes are used for an intra prediction of the current block, the deriving the intra prediction mode of the current block may comprise mapping an intra prediction mode of at least one neighbor block of the current block on a corresponding intra prediction mode among the maximum M intra prediction modes, and deriving the intra prediction mode of the current block, based on the mapped intra prediction mode.

In the image decoding method according to the present invention, when the derived intra prediction mode of the current block is a non-angular mode, the intra prediction for the current block may be performed based on the derived intra prediction mode without performing the step of inverse-mapping.

In the image decoding method according to the present invention, n consecutive angular modes among the maximum N intra prediction modes may correspond to one angular mode among the maximum M intra prediction modes, in which the n may be an integer of 2 or larger.

In the image decoding method according to the present invention, the n is a square number of 2, and the inverse-mapping may be performed by applying a binary left shift operation with respect to the intra prediction mode of the current block.

In the image decoding method according to the present invention, the method may further comprise decoding second information indicating any one mode among the n angular modes, wherein the inverse-mapping may comprise selecting one mode among the n angular modes, based on the decoded second information.

In the image decoding method according to the present invention, the inverse-mapping may be performed based on a mapping table showing a mapping relationship between each mode of the maximum N intra prediction modes and each mode of the maximum M intra prediction modes.

In the image decoding method according to the present invention, the deriving the intra prediction mode of the current block based on the mapped intra prediction modes may comprise constructing a list by using the mapped intra prediction modes, decoding index information of the list, and determining an intra prediction mode indicated by the decoded index information among the intra prediction modes included in the list as the intra prediction mode of the current block.

In the image decoding method according to the present invention, the maximum number of candidate modes included in the list may be determined based on at least any one of a size and a shape of the current block.

In the image decoding method according to the present invention, when the number of candidate modes included in the list is less than the maximum number, a mode obtained by adding an offset value to an angular mode of the candidate modes included in the list may be added to the list.

In the image decoding method according to the present invention, when the number of candidate modes included in the list is less than the maximum number, a predetermined mode may be added to the list, and the predetermined mode may be at least any one of a non-angular mode, a vertical mode, a horizontal mode, and a diagonal mode.

An image decoding apparatus according to the present invention may comprise an intra prediction unit which performs decoding first information indicating whether a maximum of N intra prediction modes are used or a maximum of M intra prediction modes are used for an intra prediction for a current block, in which the M is smaller than the N, deriving an intra prediction mode of the current block, inverse-mapping the derived intra prediction mode on a corresponding intra prediction mode among the maximum N intra prediction modes when the decoded first information indicates that the maximum M intra prediction modes are used for the intra prediction for the current block, and generating an intra prediction block by performing an intra prediction for the current block, based on the inverse-mapped intra prediction mode.

An image encoding method according to the present invention may comprise determining whether a maximum of N intra prediction modes are used or a maximum of M intra prediction modes are used for an intra prediction for a current block, determining an intra prediction mode of the current block, inverse-mapping the derived intra prediction modes on a corresponding intra prediction mode among the maximum N intra prediction modes when the maximum M intra prediction modes are used for the intra prediction for the current block, and generating an intra prediction block by performing an intra prediction for the current block, based on the inverse-mapped intra prediction mode.

An image encoding apparatus according to the present invention may comprise an intra prediction unit which performs determining whether a maximum of N intra prediction modes are used or a maximum of M intra prediction modes are used for an intra prediction for a current block, determining an intra prediction mode of the current block, inverse-mapping the derived intra prediction modes on a corresponding intra prediction mode among the maximum N intra prediction modes when the maximum M intra prediction modes are used for the intra prediction for the current block, and generating an intra prediction block by performing an intra prediction for the current block, based on the inverse-mapped intra prediction mode.

A recording medium according to the present invention may store a bitstream generated by an image encoding method according to the present invention.

Advantageous Effects

According to the present invention, a method and apparatus for encoding and decoding an image to enhance compression efficiency may be provided.

According to the present invention, a method and apparatus for encoding and decoding an image using intra prediction to enhance compression efficiency may be provided.

According to the present invention, a recording medium storing a bitstream generated by an image encoding method/apparatus of the present invention may be provided.

DESCRIPTION OF DRAWINGS

FIG. 8 is a diagram illustrating relationship between the maximum number of intra prediction modes allowed by the encoder/decoder and the maximum number of available intra prediction modes for a current block.

MODE FOR CARRYING OUT THE INVENTION

Figure 1:
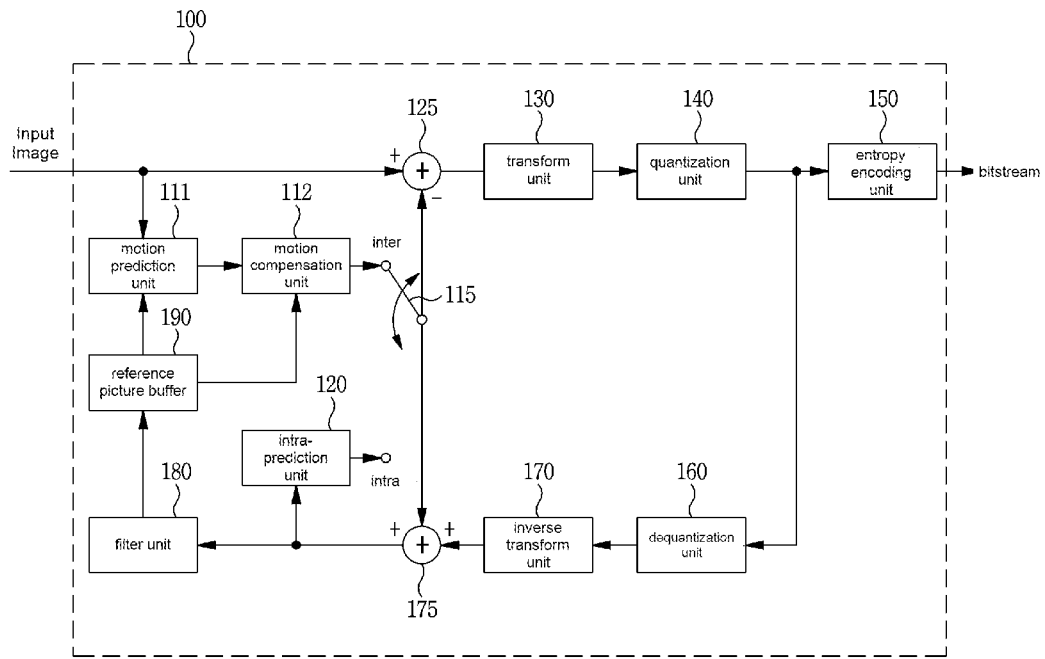
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Description of Terms

Encoder: means an apparatus performing encoding.
Decoder: means an apparatus performing decoding
Block: is an M×N array of a sample. Herein, M and N mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.
Sample: is a basic unit constituting a block. It may be expressed as a value from 0 to $2^{Bd}-1$ according to a bit depth ($B_d$). In the present invention, the sample may be used as a meaning of a pixel.
Unit: refers to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.
Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a pixel block that becomes a process unit when encoding/decoding an image as an input image.

Coding Tree Block: may be used as a term for designating any one of a Y coding tree block, Cb coding tree block, and Cr coding tree block.

Neighbor Block: means a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: means a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at the same position as the current block of the current picture within a reference picture, or a neighbor block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-prediction, intra-prediction, inter-compensation, intra-compensation, and motion compensation. A single prediction unit may be partitioned into a plurality of partitions with a small size, or may be partitioned into a lower prediction unit.

Prediction Unit Partition: means a form obtained by partitioning a prediction unit.

Transform Unit: means a basic unit when performing encoding/decoding such as transform, inverse-transform, quantization, dequantization, transform coefficient encoding/decoding of a residual signal. A single transform unit may be partitioned into a plurality of transform units having a small size.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a pixel value of a block that has been already encoded/decoded and is adjacent to a current block as a reference pixel. The intra-prediction unit 120 may perform spatial prediction by using a reference pixel, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. The reference image may be stored in the reference picture buffer 190.

The motion compensation unit 112 may generate a prediction block by performing motion compensation using a motion vector. Herein, inter-prediction may mean inter-prediction or motion compensation.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of pixel information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), an intra-prediction mode/direction, a reference sample filtering method, a prediction block filtering method, a prediction block filter tap, a prediction block filter coefficient, an inter-prediction mode, motion information, a motion vector, a reference picture index, a inter-prediction angle, an inter-prediction indicator, a reference picture list, a reference picture, a motion vector predictor candidate, a motion vector candidate list, whether to use a merge mode, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a transform coefficient, a transform coefficient level, a transform coefficient level scanning method, an image displaying/outputting sequence, slice identification information, a slice type, slice partition information, tile identification information, a tile type, tile partition information, a picture type, a bit depth, and information of a luma signal or chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to the reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based pixels included in several rows or columns which are included in the block. When a deblocking filter is applied to a block, another filter may be applied according to a required deblocking filtering strength.

In order to compensate an encoding error, a proper offset value may be added to a pixel value by using a sample adaptive offset. The sample adaptive offset may correct an offset of a deblocked image from an original image by a pixel unit. A method of partitioning pixels of an image into a predetermined number of regions, determining a region to which an offset is applied, and applying the offset to the determined region, or a method of applying an offset in consideration of edge information on each pixel may be used.

The adaptive loop filter may perform filtering based on a comparison result of the filtered reconstructed image and the original image. Pixels included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

Figure 2:
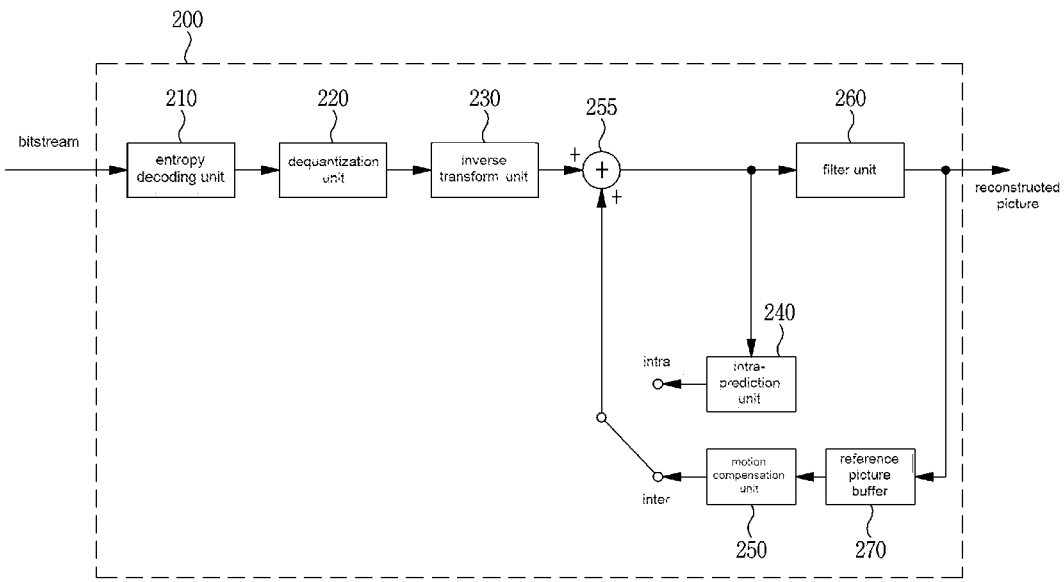
FIG. 2 is a block diagram showing configurations of a decoding apparatus according to an embodiment of the present invention.

The reconstructed block or the reconstructed image having passed through the filter unit 180 may be stored in the reference picture buffer 190. FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level, the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing spatial prediction that uses a pixel value of a block adjacent to a decoding target block and which has been already decoded.

When an inter mode is used, the motion compensation unit 250 may generate a prediction block by performing motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction.

Figure 3:
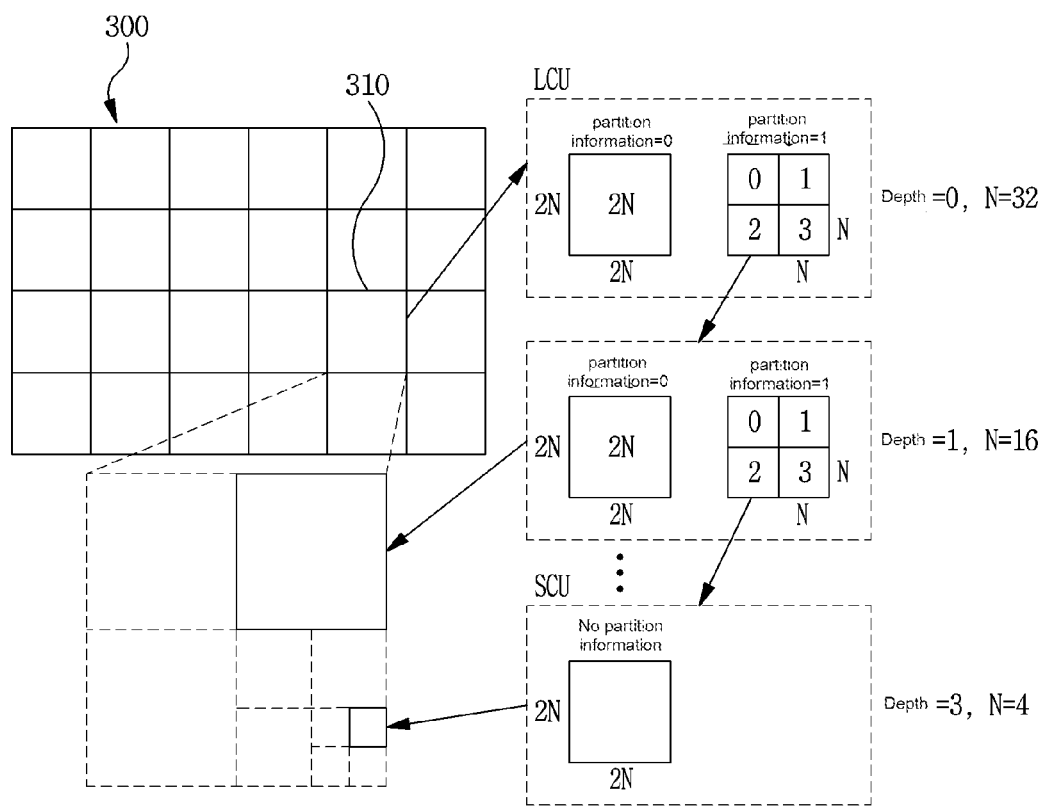
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra mode and an inter mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned in a layer associated with depth information based on a tree structure. Each of partitioned lower unit may have depth information. Depth information may be information representing a size of a CU, and may be stored in each CU.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning.

In addition, information whether or not the CU is partitioned may be represented by using partition information of the CU. The partition information may be 1-bit information.

All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 320 of FIG. 3 is an example of an LCU to which both of partitioning of a quad-tree form and partitioning of a binary-tree form are applied.

Figure 4:
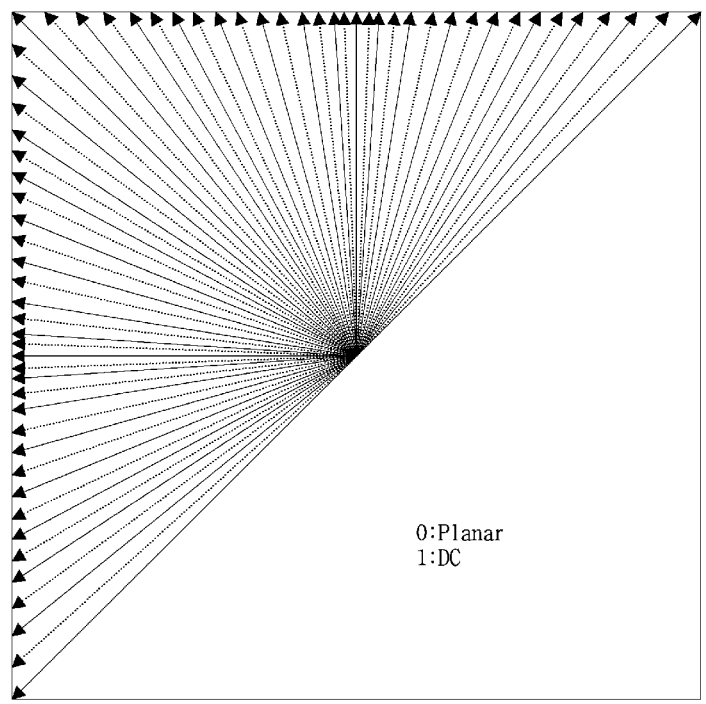
FIG. 4 is a view for explaining an embodiment of a process of intra prediction.

FIG. 4 is a view showing an intra-prediction process.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, and a mode angle. A number of intra-prediction modes may be M including 1, and the non-angular and the angular mode.

A number of intra-prediction modes may be fixed to N regardless of a block size. Alternatively, a number of intra-prediction modes may vary according to a block size or a color component type or both. For example, as a block size becomes large, a number of intra-prediction modes may increase. Alternatively, a number of intra-prediction modes of a luma component block may be larger than a number of intra-prediction modes of a chroma component block.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
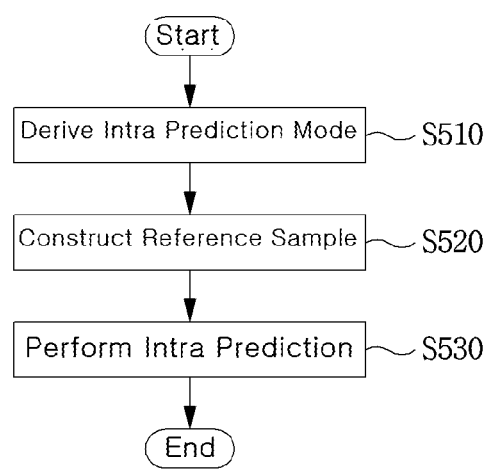
FIG. 5 is a view for explaining intra prediction according to the present invention.

FIG. 5 is a view showing intra-prediction according to the present invention.

Intra-prediction of a current block may include: step S510 of deriving an intra-prediction mode, step S520 of configuring a reference sample, and/or step S530 of performing intra-prediction.

In step S510, an intra-prediction mode of a current block may be derived. The intra-prediction mode of the current block may be derived by using a method of using an intra-prediction mode of a neighbor block, a method of entropy encoding/decoding an intra-prediction mode of a current block from a bitstream or a method of using a coding parameter of a neighbor block. According to the method of using the intra-prediction mode of the neighbor block, the intra-prediction mode of the current block may be derived by using at least one intra-prediction mode derived by using an intra-prediction mode of a neighbor block, a combination of at least one intra-prediction mode of a neighbor block, and at least one MPM (MPM and secondary MPM).

In step S520, a reference sample may be configured by performing at least one of reference sample selecting and reference sample filtering.

In step S530, intra-prediction may be performed by performing at least one of non-angular prediction, angular prediction, positional information based prediction, and luma/chroma signal based prediction. When angular prediction is performed, prediction having angles different by a predetermined unit that includes at least one sample of the current block may be performed. The predetermined unit may be, for example, at least one of a singular sample, a sample group, a line, and a block. In step S530, filtering on a prediction sample may be additionally performed.

Hereinbelow, the intra prediction mode deriving step S510 according to the present invention will be described.

As described above, an intra prediction mode of a current block may be derived by using most probable modes (MPMs) that are synthesized based on intra prediction modes of neighbor blocks of a current block. In this case, information on one or more intra predictions is subjected to entropy encoding/decoding, thereby deriving an intra prediction mode of the current block.

Candidate modes included in an MPM list may be derived based on intra prediction modes of the neighbor blocks. The number of MPM candidates may vary depending on the block size and/or the block shape of the current block. Alternatively, the number of the MPM candidates may be a fixed value of N. When there is a plurality of MPM lists, the numbers of the MPM candidates in the respective MPM lists may be equal to or different from each other.

When a current block has a predetermined size, one MPM list may be constructed for the current block. When the current block is partitioned into a plurality of sub-blocks, the sub-blocks may share the MPM list prepared for the current block. The current block and the sub-blocks each may have a size of M×N (M and N are both positive integers). Examples of the size of the current block or the size of the sub-block may include a coding tree unit (CTU), a coding unit (CU), a signaling unit (SU), a QTMax, a QTMin, a BTMax, a BTMin, 4×4, 8×8, 16×16, 32×32, 64×64, 128×128, 256×256, 4×8, 8×16, 16×8, 32×64, 32×8, and 4×32. In this case, QTMax and QTMin respectively refer to the maximum size and the minimum size that can be obtained through quad-tree partitioning. BTMax and BTMin respectively represent the maximum size and the minimum size that can be obtained through binary-tree partitioning. Hereinbelow, the size of the sub-block also may refer to the partitioned structure of the sub-block.

An indicator (MPM flag or prev_intra_luma_pred_flag) indicating whether or not the MPM list includes a mode that is identical to the intra prediction mode of the current block may be encoded or decoded.

When the indicator indicates that that a mode identical to the intra prediction mode of the current block is included in the MPM list, index information (mpm_idx) indicating which mode in the MPM list is identical to the intra prediction mode of the current block is encoded or decoded so that the intra prediction mode of the current block can be derived.

When the indicator indicates that a mode identical to the intra prediction mode of the current block is not included in the MPM list, the intra prediction mode of the current block can be derived through encoding/decoding. In this case, intra prediction modes that are not included in the MPM list may be sorted in ascending or descending order.

When the indicator is 0, a secondary MPM candidate list is constructed by using one or more intra prediction modes that are not included in the MPM list.

When the intra prediction mode of the current block is included in the secondary MPM candidate list, a secondary MPM flag is set to 1 and the intra prediction mode of the current block can be derived through encoding/decoding of a secondary MPM index (2nd_mpm_idx). When the secondary MPM flag is 1, an intra prediction mode of a luma component can be derived by using the secondary MPM index and at least any one of intra prediction modes of encoded or decoded adjacent units.

When both of the MPM flag and the secondary MPM flag are 0, an intra prediction of a luma component may be encoded or decoded using a luma component intra prediction mode index (rem_intra_luma_pred_mode).

An intra prediction mode of a chroma component may be derived by using at least one of a chroma component intra prediction mode index (intra_chroma_pred_mode) and the intra prediction mode of the corresponding luma block.

When the current block is encoded in an intra prediction mode, the MPM list can be constructed using intra prediction modes of encoded or decoded temporal and spatial neighbor blocks and/or at least one predefined specific intra prediction mode.

Figure 6:
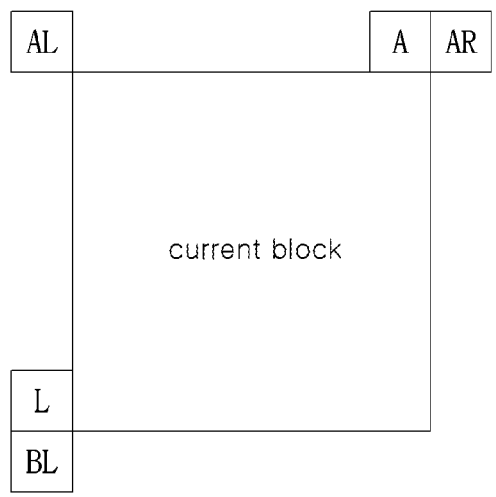
FIG. 6 is a diagram illustrating temporal and spatial neighbor blocks used in construction of the MPM list.

FIG. 6 is a diagram illustrating temporal and spatial neighbor blocks used in construction of the MPM list.

When the MPM list includes six intra prediction modes, a maximum of five MPM candidates may be sequentially derived from spatial neighbor blocks illustrated in FIG. 6. The order in which the MPM candidates are derived from the neighbor blocks may be arbitrarily set in an encoder/decoder. For example, the MPM candidates are derived in the order of left L, above A, below-left BL, above-right AR, and above-left AL.

A planar mode and/or DC mode that is a non-angular mode has a high occurrence probability. Accordingly, when the planar mode and/or the DC mode is/are not included in the five intra prediction modes derived from the spatial neighbor blocks, the MPM list may be updated to include the planar mode and/or the DC mode. The position(s) of the planar mode and/or the DC mode in the MPM list may be arbitrarily set in the encoder/decoder. For example, in the MPM list, modes are arranged in the order of modes of the left L, the above A, the planar, the DC, the below-left BL, the above-right AR, and the above-left AL.

When constructing the MPM list, a redundancy check is performed such that MPM candidates are not duplicated in the MPM list. After performing the redundancy check, when the number of intra prediction modes included in the MPM list is smaller than the maximum number (for example, 6) of intra prediction modes that can be maximally included in the MPM list, more MPM candidates can be added to the MPM list, based on the intra prediction modes that are included in the MPM list. That is, more MPM candidates are added until the number of intra prediction modes in the MPM list reaches the maximum number. For example, a mode obtained by adding an offset value to an angular mode included in the MPM list may be added to the MPM list. The offset value may be +N and/or −N. For example, N is an integer of 1, or an integer of 2 or larger.

When the number of intra prediction modes in the MPM list still does not reach the maximum number even after performing the method described above, at least one predetermined specific intra prediction mode may be added to the MPM list. The added predetermined specific intra prediction mode may be an intra prediction mode having a high occurrence probability. For example, examples of the predetermined specific intra prediction mode may include at least one of a vertical mode, a horizontal mode, a down-left diagonal mode, an up-left diagonal mode, and an up-right diagonal mode. When there are multiple modes as the predetermined specific intra prediction mode, the multiple modes are sequentially added to the MPM list in a specific order. The modes may be added in the order of the vertical mode, the horizontal mode, the down-left diagonal mode, the up-left diagonal mode, and the up-right diagonal mode. When the maximum number of available intra prediction modes in the encoder/decoder is 67, there may be 65 angular modes ranging from Mode 2 to Mode 66 in addition to non-angular modes including planar mode (Mode 0) and DC mode (Mode 1). In this case, the vertical mode, the horizontal mode, the down-left diagonal mode, the up-left diagonal mode, and the up-right diagonal mode may be respectively referred to as Mode 50, Mode 18, Mode 2, Mode 34, and Mode 66.

As described above, at least any one of candidate modes of the MPM list and/or the secondary MPM list may be derived from intra prediction modes of spatial neighbor blocks of the current block.

When a plurality of sub-blocks having a smaller size/shape than that of the current block is disposed above the current block and when part or all of the plurality of sub-blocks have one or more different intra prediction modes, the one or more different intra prediction modes may be added as MPM candidates. Similarly, when a plurality of sub-blocks having a smaller size/shape than that of the current block is disposed at the left side of the current block and when part or all of the sub-blocks have one or more different intra prediction modes, the one or more different intra prediction modes may be added as MPM candidates. Alternatively, among blocks included in a current slice, statistic characteristics of the intra prediction modes of the blocks that have been intra-frame predicted ahead of the current block may be used. For example, as the statistic characteristics of the intra prediction modes, an occurrence frequency may be used. In this case, first M intra prediction modes with highest occurrence frequency may be added as MPM candidates. For example, M is an integer of 1 or 2 or larger.

Figure 7:
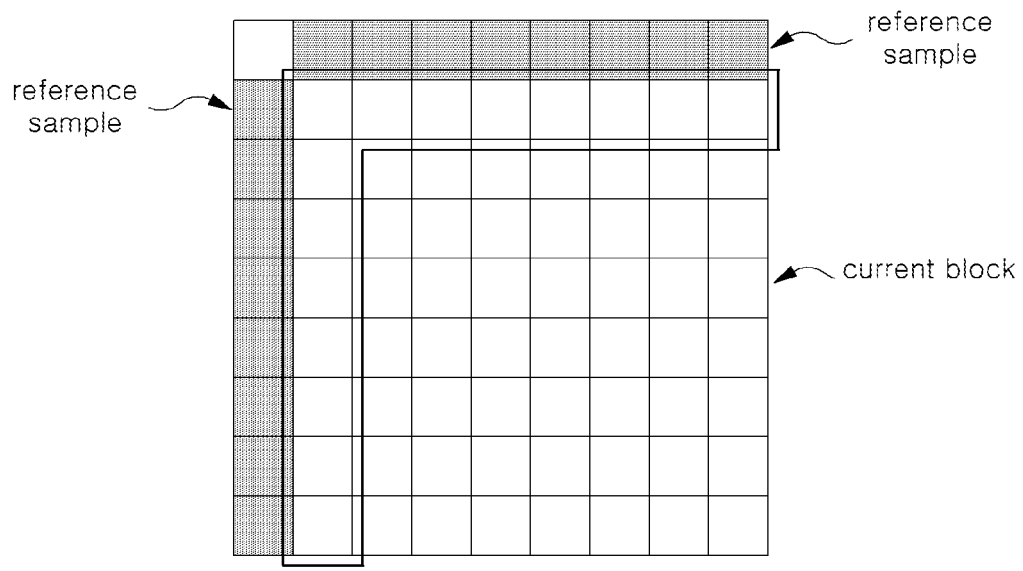
FIG. 7 is a diagram illustrating a method of deriving MPM candidates for a current block.

FIG. 7 is a diagram illustrating a method of deriving MPM candidates for a current block.

First, prediction blocks fora current block are obtained for all the intra prediction modes. Then, as illustrated in FIG. 7, the sum of absolute differences (SAD) at the boundary between reference samples around the current block and prediction samples adjacent to the reference samples in each prediction block of the current block is obtained. Subsequently, all the intra prediction modes are arranged in ascending order of the boundary SAD, i.e. from an intra prediction mode with lest boundary SAD to an intra prediction mode with most boundary SAD. Subsequently, a predetermined number of intra prediction modes with least boundary SADs are added to the MPM list and/or the secondary MPM list. In the encoder, since the boundary SADs between prediction samples in an arbitrary prediction block for the current block and reference samples can be derived in an actual encoding process, additional calculations are not necessary. However, in the decoder, additional calculations need to be performed.

In the example of FIG. 7, a current block has a 8×8 size and prediction blocks for the current block may be generated for all of the intra prediction modes that are available in the encoder/decoder. With respect to the boundary of the left line and/or the top line of a generated prediction block of the current block, the boundary SAD between at least one reference sample and at least one prediction sample that are adjacent to the boundary can be calculated. Intra prediction modes may be arranged in ascending order of the values of the boundary SAD. M intra prediction modes with least boundary SAD values may be added to the MPM list or the secondary MPM list as the one or more intra prediction mode candidates.

When one or more reference sample lines are used, the boundary SAD may be calculated with respect to each reference sample line using the method described above.

When calculating the boundary SAD, one or more left sample lines in each prediction block of the current block may be used. Similarly, one or more top sample lines in each prediction block of the current block may be used.

Information indicating that the MPM list and/or the secondary MPM list is/are constructed using at least one method of the methods described above may be encoded or decoded, or implicitly derived in the decoder. According to the present invention, encoding/decoding of information can be performed using at least one of the following entropy encoding methods. The information is then binarized and finally encoded or decoded by CABAC (a e (v)).

Truncated Rice binarization process
    K-th order exp_golomb binarization process
    Limited K-th order exp_golomb process
    Fixed-length binarization process
    Unary binarization process
    Truncated unary binarization process When the maximum number of intra prediction modes allowed by the encoder/decoder is N, the number of available intra prediction modes for a current block may be M that is a positive integer smaller than N. That is, the current block can be encoded or decoded using only M intra prediction modes. Whether to apply encoding/decoding using M intra prediction modes is determined depending on at least any one of intra prediction modes of the current block and/or the neighbor blocks thereof, the block size/shape of the current block, and the size/shape of a transform unit.

FIG. 8 is a diagram illustrating relationship between the maximum number of intra prediction modes allowed by the encoder/decoder and the maximum number of available intra prediction modes for a current block.

For example, as illustrated in FIG. 8, the maximum number of intra prediction modes allowed by the encoder/decoder may be 67. In this case, when encoding efficiency is good in terms of a rate-distortion cost function even with the use of only some intra prediction modes (for example, even-numbered or odd-numbered intra prediction modes) of the 67 intra prediction modes for prediction blocks obtained through intra predictions in an arbitrary coding block size, the following method according to the present invention can be applied. The arbitrary coding block size (or shape) may be a predetermined size (or shape) or larger, or a size (or shape) within a predetermined size (or shape) range. For example, when the arbitrary coding block size is 32×32, all partitioned quad-tree and/or binary-tree sub-blocks in the 32×32 coding block may be encoded using only even-numbered or odd-numbered intra prediction modes. At least one kind of information, among information on the size and/or shape of the arbitrary coding block and information indicating whether even-numbered intra prediction modes are used or odd-numbered intra prediction modes are used with respect to the prediction blocks in the coding block, may be encoded or decoded. Alternatively, the information may be implicitly derived in the decoder.

In the example of FIG. 8, the maximum number of intra prediction modes allowed by the encoder/decoder may be 67 and the maximum number of available intra prediction modes for an arbitrary coding block may be 35. When the maximum number of available intra prediction modes is 67, a vertical mode among the intra prediction modes is Mode 50. When the maximum number of available intra prediction modes is reduced to 35, a vertical mode among the intra prediction modes may be Mode 26. That is, when the maximum number of available intra prediction modes is changed, the intra prediction modes are mapped as illustrated in FIG. 8. When the maximum number of available intra prediction modes is 67 or 35, Mode 0 refers to planar mode, Mode 1 refers to DC mode, and indices of angular modes may start from 2.

In the example of FIG. 8, directions of shaded intra prediction modes in the case in which the maximum number of intra prediction modes is 67 respectively match with directions of intra prediction modes in the case in which the maximum number of intra prediction modes is That is, the even-numbered intra prediction modes in the case in which the maximum number of intra prediction modes is 67 and the intra prediction modes in the case in which the maximum number of intra prediction modes is 35 respectively differ in terms of the mode value (index) but respectively match in terms of the direction.

When the maximum number of available intra prediction modes for a current block is not 67 but 35, intra prediction modes to be included in the MPM list and the secondary MPM list are newly mapped with reference to a maximum of 35 intra prediction modes. In this case, a maximum of 67 intra prediction modes may be mapped on a maximum of 35 intra prediction modes. After performing encoding using a maximum of 35 intra prediction modes, the used intra prediction modes may be inverse-mapped with reference to a maximum of 67 intra prediction modes. The mapping process and the inverse mapping process may be performed in the same manner in the encoder/decoder.

As described above, FIG. 8 illustrates a mapping relationship between a maximum of 67 intra prediction modes and a maximum of 35 intra prediction modes. The mapping/inverse mapping process is performed using shift operations of Equation 1 and Equation 2.

Mapping: $X'=(X>>1)+1$, [Equation 1]

Inverse mapping: $X=(X'-1)<<1$ [Equation 2]

In Equation 1 and Equation 2, X is one angular mode selected among a maximum of 67 intra prediction modes, and X' is one angular mode selected among a maximum 35 intra prediction modes and corresponding to the mode X.

Mapping/inverse mapping of an angular mode can be performed in various ways in addition to the method described above. For example, the encoder/decoder may perform mapping/inverse mapping by sharing and referring to a lookup table shown in FIG. 8.

In the case of a non-angular mode such as planer mode or DC mode, Mode 0 or Mode 1 may be used without performing the mapping/inverse mapping.

Figure 9:
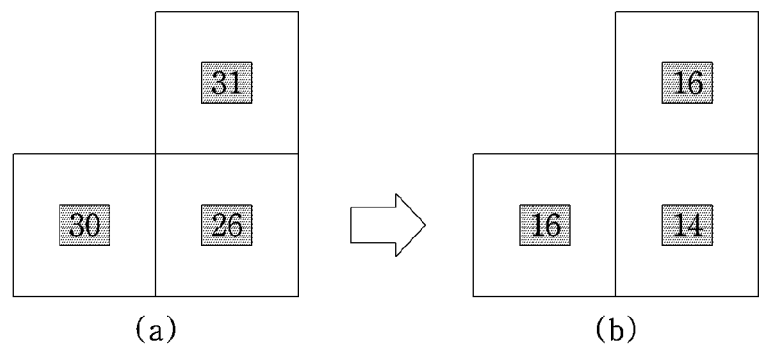
FIG. 9 is a diagram illustrating a process of mapping intra prediction modes of neighbor blocks.

FIG. 9 is a diagram illustrating a process of mapping intra prediction modes of neighbor blocks.

As illustrated in FIG. 9(a), with reference to a maximum of 67 intra prediction modes, intra prediction modes of a current block, a left neighbor block, and an above neighbor block may be respectively Mode 26, Mode 30, and Mode 31.

When encoding a current block using a maximum of 35 intra prediction modes, intra prediction modes included in the MPM list and/or the secondary MPM list may be restructured through the mapping process. That is, MPM candidates and secondary MPM candidates are derived from a maximum of 35 intra prediction modes, and then an intra prediction mode of a current block may be encoded by using at least one of the MPM flag, the MPM_idx, the secondary MPM flag, the 2nd_mpm_idx, and the rem_intra_luma_pred_mode.

Information indicating the intra prediction modes are encoded through the method described above may be encoded or decoded. Alternatively, the information may be implicitly derived by the decoder, on the basis of at least one of the intra prediction mode(s) of the current block and/or the neighbor blocks thereof, the block size/shape, and the size/partition information of a transform unit.

The decoder may explicitly or implicitly derive information that that an intra prediction mode of a current block is encoded through the method described above, and then may derive MPM candidates and/or secondary MPM candidates such that the modes are mapped on a maximum of 35 intra prediction modes through the same mapping method performed by the encoder. The decoder may decode the intra prediction mode of the current block using at least any one of an MPM flag, an MPM_idx, a secondary MPM flag, a 2nd_mpm_idx 21, and a rem_intra_luma_pred_mode, with reference to a maximum of 35 intra prediction modes.

The decoder performs inverse mapping with respect to the decoded intra prediction mode, thereby deriving one intra prediction mode among a maximum of 67 intra prediction modes.

In the example of FIG. 8, when the decoded intra prediction mode of the current block is Mode 25 with reference to a maximum of 35 intra prediction modes, the decoded intra prediction mode of the current block may be Mode 48 or Mode 49 with reference to a maximum of 67 intra prediction modes. In this case, information that explicitly indicate that all of the intra prediction modes for an arbitrary coding block are odd-numbered or even-numbered intra prediction modes among 67 intra prediction modes may be explicitly transmitted. When all of the intra prediction modes are odd-numbered modes, the final intra prediction mode of the current block may be Mode 49. Meanwhile, when all of the intra prediction modes are even-numbered modes, the final intra prediction mode of the current block may be Mode 48.

Information (flag information) indicating that a reduced number of intra prediction modes are used for a current block may be signaled. Alternatively, information indicating that odd-numbered or an even-numbered intra prediction modes are used for a quad-tree block or a binary-tree block generated by partitioning a coding block having an arbitrary size/shape, may be signaled. With respect to all of the blocks partitioned from a coding block having an arbitrary size/shape, only either even-numbered or odd-numbered intra prediction modes may be used. In this case, information indicating which kind of intra prediction mode among even-numbered intra prediction modes and odd-numbered intra prediction modes is used may not be signaled. For example, in the case in which odd-numbered intra prediction modes are used for blocks in an arbitrary coding block, Mode 25 among a maximum of 35 intra prediction modes may be derived as Mode 48 and Mode 49 among a maximum of 67 intra prediction modes through the inverse mapping process, and Mode 49 is finally derived from the information that the used intra prediction modes are odd-numbered intra prediction modes.

Similarly, in the case in which even-numbered intra prediction modes are used for blocks in an arbitrary coding block, Mode 25 among a maximum of 35 intra prediction modes may be derived as Mode 48 among a maximum of 67 intra prediction modes.

In the example described above, mapping and inverse mapping of intra prediction modes are described with respect to the case in which only 35 intra prediction modes among a maximum of 67 intra prediction modes are used for encoding/decoding a current block. However, the maximum number of intra prediction modes may not be limited to 67 or 35. That is, the present invention may be extended to a case in which a current block is encoded or decoded with M intra prediction modes among a maximum of N intra prediction modes. In this case, M is a positive integer smaller than N.

In addition, as illustrated in FIG. 8, the present invention may not be limited to a case in which two angular prediction modes of the N intra prediction modes are mapped on one angular prediction mode of the M intra prediction modes.

For example, K angular prediction modes of the N intra prediction modes may be mapped on one angular prediction mode of the M intra prediction modes. In this case, the K angular prediction modes may be consecutive modes. When K is 2n such as 2, 4, 8, etc., the mapping and the inverse mapping may be performed using an n shift operation. In addition, as information required for inverse mapping (i.e. information corresponding to information indicating either an odd number or an even number), the remainder of the division operation with a divisor of K may be signaled, or a fixed value K may be used in the encoder/decoder. Alternatively, the mapping and inverse mapping may be performed by referring to a lookup table shared by the encoder and the decoder.

Hereinafter, the reference sample construction step S520 of the present invention will be described. Particularly, a reference sample filtering process will be described.

Reference samples used for an intra prediction may be constructed based on the intra prediction mode derived in the intra prediction mode deriving step S510. The reference samples used for an intra prediction can be constructed by using one or more reconstructed neighboring samples disposed around a current block, or a sample combination of reconstructed neighboring samples around a current block. The constructed reference samples may undergo filtering.

For construction of reference samples, availability of the reconstructed neighboring samples may be determined. When the reconstructed neighboring samples are disposed outside a picture, a slice, a tile, or a CTU, the reconstructed samples are determined as being unavailable. When performing a constrained intra prediction for a current block, in the case in which the reconstructed neighboring samples are disposed in blocks that have been encoded or decoded through an inter frame prediction method, the reconstructed neighboring samples are determined as being unavailable.

Figure 10:
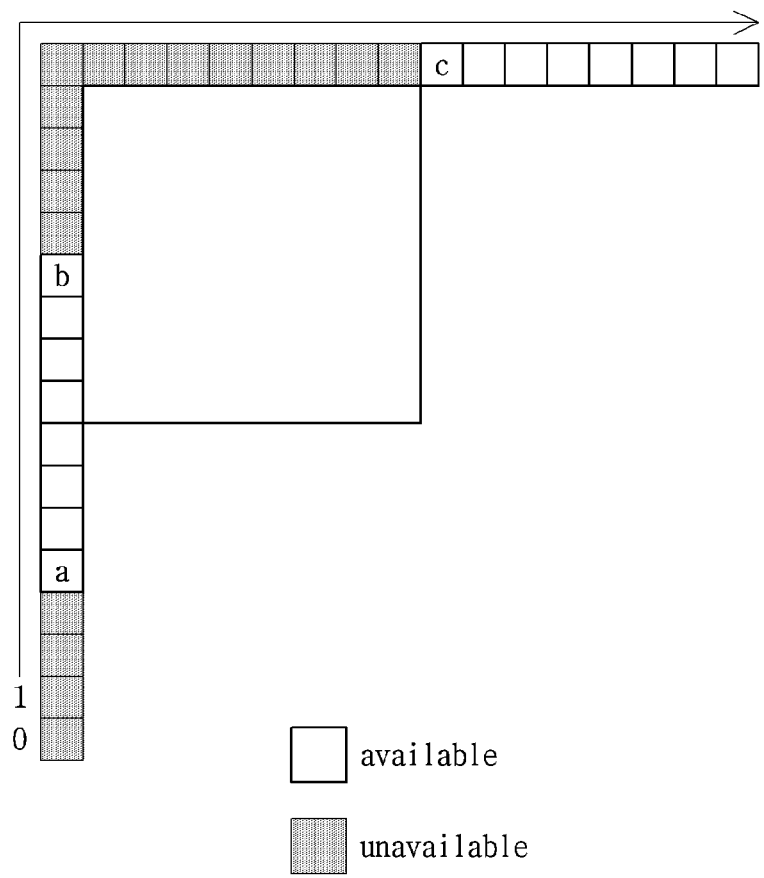
FIG. 10 is a diagram illustrating a method of replacing unavailable reconstructed samples with available reconstructed samples.

FIG. 10 is a diagram illustrating a method of replacing unavailable reconstructed samples with available reconstructed samples.

When the reconstructed neighboring samples are determined as being unavailable, the unavailable samples may be replaced with neighboring available samples. For example, when there are available samples and unavailable samples as illustrated in FIG. 10, the unavailable samples may be replaced with one or more available samples.

Sample values of the unavailable samples may be sequentially replaced with a sample value of an available sample in a predetermined order. The available sample used to replace the unavailable sample may be a sample adjacent to the unavailable sample. When there is no adjacent available sample, a sample that firstly appears or a sample that is closest to the unavailable sample may be used to replace the unavailable sample. The replacement order of unavailable samples may start from a below-left sample and progress toward an above-right sample. Alternatively, the replacement order may start from an above-right sample and progress toward a below-left sample. Alternatively, the replacement order may start from an above-left corner and progress toward an above-right sample and/or a below-left sample. Alternatively, the replacement order may start from an above-right sample and/or a below-left sample and progress toward an above-left corner.

As illustrated in FIG. 10, replacement of unavailable samples may start from the below-left sample 0 and progress in a direction toward the above-right sample. In this case, the sample values of the first four unavailable samples may be replaced with the sample value of a firstly appearing available sample or a closest available sample a. The samples values of the next 13 unavailable samples may be replaced with the sample value of a last available sample b.

Alternatively, unavailable samples may be replaced by using a combination of available samples. For example, the sample values of unavailable samples may be replaced with a mean value of the sample values of available samples adjacent to unavailable samples disposed at respective ends of an unavailable sample line. For example, as illustrated in FIG. 10, the first four unavailable samples may be allocated with the sample value of the available sample a, and the next 13 unavailable samples may be allocated with the mean value of the sample values of the available samples b and c. Alternatively, the sample values of the 13 unavailable samples may be replaced with an arbitrary sample value between the sample values of the available samples b and c. In this case, the sample values of the unavailable samples may be respectively replaced with different values. For example, as the distance of an unavailable sample to the available sample b is decreased, the sample value of the unavailable sample may be replaced with a sample value that more closely approximates the sample value of the available sample b. Similarly, as the distance of an unavailable sample to the available sample c is decreased, the sample value of the unavailable sample may be replaced with a sample value that more closely approximates the sample value of the available sample c. That is, the sample value of an unavailable sample may be determined depending on the distance to the available sample b and/or the available sample c from the unavailable sample.

One or more methods among a plurality of methods of replacing unavailable samples with available samples, including the method described above, may be selectively used. The unavailable sample replacement method may be signaled through information included in a bitstream or may be preset by an encoder and a decoder. The unavailable sample replacement method may be derived in a predetermined manner. For example, the unavailable sample replacement method may be selected based on a difference between sample the values of the available samples b and c and/or based on the number of unavailable samples. For example, the unavailable sample replacement method may be selected through comparison between a difference between sample values of two available samples and a critical value thereof and/or comparison between the number of unavailable samples and a critical value thereof. For example, when the difference between sample values of two available samples is larger than the critical value thereof and/or when the number of unavailable samples is larger than the critical value thereof, the sample values of the unavailable samples may be replaced respectively with different values.

The unavailable sample replacement method may be performed in the unit of a predetermined size. For example, the replacement may be performed in the unit of at least one of a video, a sequence, a picture, a slice, a tile, a coding tree unit, a coding unit, a prediction unit, and a transform unit. The unavailable sample replacement method is selected based on information signaled in the unit of a predetermined size, or may be derived in the unit of a predetermined size. As the unavailable sample replacement method, a method that is predetermined by an encoder and a decoder may be used.

Figure 11:
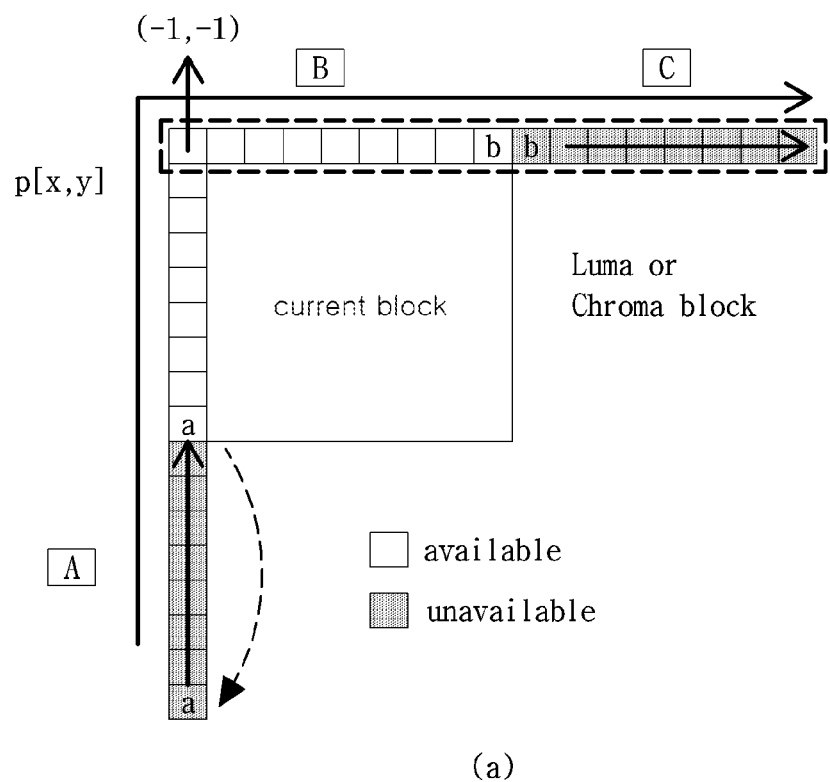
FIG. 11 is a diagram illustrating another method of replacing unavailable reconstructed samples with available reconstructed samples.
Figure 11:
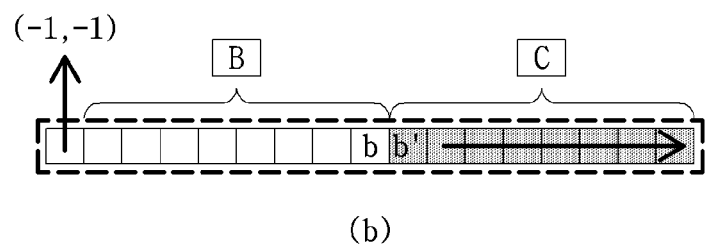

FIG. 11 is a diagram illustrating another method of replacing unavailable reconstructed samples with available reconstructed samples.

In the example of FIG. 11, a current block has a size of 8×8, and 8 samples included in an above-right neighbor block C of the current block, among above reference samples, are unavailable samples. In this case, as illustrated in FIG. 11(a), the sample values of the 8 unavailable samples may be replaced with a sample value b of an available sample that is closest to the 8 unavailable samples. Alternatively, as illustrated in FIG. 11(b), the sample values of the 8 unavailable samples may not be replaced with the sample value b but replaced with an arbitrary sample value b'. To calculate the sample value b', pseudo codes of Table 1 can be used.

TABLE 1

Derive b' by taking a gradient with respect to the value b
into account after calculating
average(avg.) of reference samples included in a block B:
(1) compute both avg. and delta (avg. - b)
(2) if (delta > 0)
　b' = b − (delta or (delta >> 1))
(3) else if (delta < 0)
　b' = b + (delta or (delta >> 1))
(4) else
　perform with a conventional method.

To obtain the delta, a average value, a maximum value, a minimum value a median value, the most frequent value, or a weighted sum of at least one of available samples in a block B may be used. In addition, the value b also may be obtained by using any one of a average value, a maximum value, a minimum value, a median value, the most frequent value, and a weighted sum of at least one of available samples in the block B. When the value b is derived from the available samples in the block B, the derived value b can be used to obtain the delta. One or more available samples in the block B may be an arbitrary number of non-consecutive samples. Alternatively, one or more available samples in the block B may be samples disposed at positions that are preset in an encoder/decoder.

Alternatively, the gradient corresponding to the delta can be derived from the differences between a plurality of samples disposed on the same line (row or column) as the to-be-compensated sample b'. The plurality of samples may be two or more samples that are arranged consecutively or arranged at an interval of n samples in which n is a constant equal to or larger than 0. The number and/or position of the plurality of samples may be determined variably depending on a coding parameter of a current block, or may be the fixed number and/or position that is/are preset in the encoder/decoder. The difference operation may be performed with respect to a plurality of consecutive samples in the unit of a predetermined sample group, and accordingly a plurality of deltas may be derived. The unit of the predetermined sample group may include two, three, or more samples adjacent to each other. Alternatively, the samples in the unit sample group are samples that are consecutive in at least any one direction among leftward, rightward, upward, and downward. The method described above can be identically/similarly applied to a method of calculating a gradient by using samples disposed in different lines (reconstructed sample lines or reference sample lines).

In the example of FIG. 11(a), 8 unavailable reference samples disposed in a below-left neighbor block of the current block are replaced with a sample value a of an available reference sample. Alternatively, by applying the method described above with reference to FIG. 11(b), 8 unavailable samples disposed in the below-left neighbor block of the current block may be replaced with a sample value a'. The methods described above can be applied to both the reference samples above the current block and the reference samples at the left side of the current block, or applied to only the reference samples arranged in an arbitrary direction. The arbitrary direction to which one of the above methods is applied is determined based on coding information including the size, the shape, and the intra prediction mode of the current block.

In addition, in the example of FIG. 11, all of the unavailable reference samples in the above-right neighbor block and in the below-left neighbor block of the current block may be replaced with the sample value a' or b'. Alternatively, an initial delta is gradually scaled such that the respective unavailable reference samples are allocated with respectively difference values.

Even in the case of using one or more reconstructed sample lines adjacent to the current block, the padding method may be adaptively applied.

The embodiment described with reference to FIGS. 10 and 11 may be applied to at least one of a luma component and a chroma component.

Information indicating that reference samples are padded or filtered through at least any one method of the above described methods may be encoded or decoded. Alternatively, the information may be implicitly derived in the decoder. When the information is explicitly encoded or decoded, one or more methods of the entropy encoding methods described above may be used. The information is binarized and finally encoded or decoded by CABAC (a e (v)).

An intra prediction block of a current block can be generated by performing the intra prediction S530 for the current block, based on an intra prediction mode derived in the intra prediction deriving step S510 and reference samples constructed in the reference sample construction step S520.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method comprising:
   deriving a primary intra prediction mode of a current block by decoding a bitstream,
   wherein the primary intra prediction mode is derived based on a first MPM list including at least one candidate mode and a second MPM list including at least one candidate mode;
   deriving an intra prediction mode of the current block by modifying the primary intra prediction mode, in case the primary intra prediction mode is a directional prediction mode;
   generating a prediction block for the current block by performing intra prediction for the current block based on either the primary intra prediction mode or the derived intra prediction mode; and
   reconstructing the current block based on the prediction block, and
   wherein the current block is derived by dividing a coding tree block using quad-tree division.

2. The method of claim 1,
   wherein the deriving the intra prediction mode based on the primary intra prediction mode is performed based on a shape of the current block.

3. The method of claim 2,
   wherein the deriving the intra prediction mode based on the primary intra prediction mode is performed in case the shape of the current block is a predetermined shape.

4. The method of claim 1,
   wherein, in case the primary intra prediction mode is a non-directional prediction mode, the deriving the intra prediction mode based on the primary intra prediction mode is not performed, and the intra prediction for the current block is performed based on the primary intra prediction mode.

5. The method of claim 1,
   wherein, in case an indicator for the first MPM list indicates that the primary intra prediction mode of the current block is not identical to a candidate mode included in the first MPM list, the primary intra prediction mode of the current block is derived based on the second MPM list and an indicator indicating one among candidate modes included in the second MPM list.

6. An image encoding method comprising:
   determining an intra prediction mode of a current block;
   generating a prediction block for the current block by performing intra prediction for the current block based on the intra prediction mode; and determining and encoding a primary intra prediction mode of the current block based on the intra prediction mode, wherein the primary intra prediction mode is encoded based on a first MPM list including at least one candidate mode and a second MPM list including at least one candidate mode, wherein the primary intra prediction mode is a directional prediction mode, wherein the current block is derived by dividing a coding tree block using quad-tree division.

7. The method of claim 6, wherein the determining and encoding the primary intra prediction mode is performed based on a shape of the current block.

8. The method of claim 7, wherein the determining and encoding the primary intra prediction mode is performed in case the shape of the current block is a predetermined shape.

9. The method of claim 6, wherein, if the intra prediction mode is a non-directional prediction mode, the intra prediction mode, instead of the primary intra prediction mode, is encoded into a bitstream.

10. The method of claim 6, wherein, in case the primary intra prediction mode of the current block is not identical to a candidate mode included in the first MPM list, an indicator for the first MPM list indicating that the primary intra prediction mode of the current block is not identical to the candidate mode included in the first MPM list, and the primary intra prediction mode of the current block is encoded using the second MPM list and an indicator indicating one among candidate modes included in the second MPM list.

11. A non-transitory computer readable recording medium storing a bitstream which is received, decoded and used to reconstruct an image by an image decoding apparatus, wherein the bitstream comprises information on prediction of a current block, the information on prediction of the current block is decoded and used to derive a primary intra prediction mode, wherein the primary intra prediction mode is derived based on a first MPM list including at least one candidate mode and a second MPM list including at least one candidate mode, the primary intra prediction mode is used to derive an intra prediction mode of the current block, in case the primary intra prediction mode is a directional prediction mode, the primary intra prediction mode or the derived intra prediction mode is used to generate a prediction block for the current block by performing intra prediction for the current block, and the prediction block is used to reconstruct the current block, wherein the primary intra prediction mode is mapped to the intra prediction mode of the current block, and wherein the current block is derived by dividing a coding tree block using quad-tree division.

* * * * *